US011786072B2

(12) United States Patent
Bauer et al.

(10) Patent No.: US 11,786,072 B2
(45) Date of Patent: Oct. 17, 2023

(54) BUN HOLDING AND THAWING

(71) Applicant: Marmon Foodservice Technologies, Inc., Osseo, MN (US)

(72) Inventors: Richard Bauer, Palatine, IL (US); Glenn Schackmuth, Oswego, IL (US); Scott Rote, Mokena, IL (US); Ilya Shimelfarb, Carol Stream, IL (US); Tyler Greek, Plainfield, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 579 days.

(21) Appl. No.: 16/834,358

(22) Filed: Mar. 30, 2020

(65) Prior Publication Data

US 2020/0305640 A1 Oct. 1, 2020

Related U.S. Application Data

(60) Provisional application No. 62/827,532, filed on Apr. 1, 2019.

(51) Int. Cl.
| | |
|---|---|
| *A47J 37/04* | (2006.01) |
| *A47J 37/08* | (2006.01) |
| *A21C 15/00* | (2006.01) |
| *A21B 3/07* | (2006.01) |
| *G07F 11/48* | (2006.01) |

(Continued)

(52) U.S. Cl.
CPC ............... *A47J 37/044* (2013.01); *A21B 3/07* (2013.01); *A21C 15/00* (2013.01); *A47J 37/08* (2013.01); *A47J 37/0871* (2013.01); *G07F 11/48* (2013.01); *G07F 11/58* (2013.01); *A47J 37/04* (2013.01); *B65D 83/0005* (2013.01)

(58) Field of Classification Search
CPC ........ A47J 37/04; A47J 37/08; A47J 37/0871; A21B 3/07; A21B 3/18; G07F 11/48; G07F 11/58; G07F 11/62; B65D 83/0005
USPC ........................ 99/387; 221/69, 87, 124, 241
See application file for complete search history.

(56) References Cited

U.S. PATENT DOCUMENTS

| | | | | |
|---|---|---|---|---|
| 1,530,387 | A | * | 3/1925 | Marra ................. A47J 37/0857 |
| | | | | 221/253 |
| 4,238,032 | A | | 12/1980 | Thurman |

(Continued)

FOREIGN PATENT DOCUMENTS

| | | |
|---|---|---|
| CN | 206797855 U | 12/2017 |
| DE | 2459479 A1 | 7/1976 |

(Continued)

OTHER PUBLICATIONS

International Search Report and Written Opinion for PCT/US2020/025927, dated Jun. 29, 2020.

(Continued)

*Primary Examiner* — Reginald Alexander
(74) *Attorney, Agent, or Firm* — Andrus Intellectual Property Law, LLP

(57) ABSTRACT

Systems and methods of bun handling include a cassette with opposed side walls. The cassette includes a front wall, an open rear face opposite the front wall, and a floor between the opposed side walls. A cover extends between the opposed side walls above the floor. The cover is movable relative to the opposed side walls and the floor. A slot is defined through the floor from the open rear face in a direction towards the front wall.

20 Claims, 9 Drawing Sheets

(51) Int. Cl.
*G07F 11/58* (2006.01)
*B65D 83/00* (2006.01)

(56) References Cited

U.S. PATENT DOCUMENTS

| | | | |
|---|---|---|---|
| 4,457,433 A | | 7/1984 | Wilson |
| 5,755,551 A | * | 5/1998 | Saeki .................. B65G 59/068 |
| | | | 414/797.9 |
| 6,495,182 B1 | * | 12/2002 | Stuck .................. B65G 59/068 |
| | | | 426/523 |
| 8,428,775 B2 | | 4/2013 | Baker et al. |
| 8,925,744 B1 | | 1/2015 | Jang et al. |
| 9,878,867 B2 | | 1/2018 | Yamamiya |
| 2016/0183728 A1 | | 6/2016 | Monk |
| 2019/0080384 A1 | | 3/2019 | Radcliffe et al. |

FOREIGN PATENT DOCUMENTS

| | | |
|---|---|---|
| DE | 2535484 A1 | 2/1986 |
| JP | S60260218 A | 12/1985 |
| WO | 2019113070 A1 | 6/2019 |
| WO | 2020006257 A1 | 1/2020 |

OTHER PUBLICATIONS

Extended European Search Report for European Patent Application No. 20784050.5, dated Nov. 23, 2022.

* cited by examiner

BUN HOLDING AND THAWING

CROSS-REFERENCE TO RELATED APPLICATIONS

The present application claims priority of U.S. Provisional Patent Application No. 62/827,532, filed on Apr. 1, 2019, the content of which is hereby incorporated by reference in its entirety.

BACKGROUND

The present disclosure is related to the field of food preparation. More specifically, the present disclosure is related to systems and methods of handling baked goods for use in the assembly of sandwiches in a food preparation setting.

Many restaurant and food service settings, particularly quick service restaurants (QSR) use a combination of pre-prepared and on-demand prepared food components in order to assemble foods ordered by customers, for example, hamburgers or sandwiches within a customer's time expectation. While one approach to order assembly would be to sequentially prepare each food item constituent on demand in the order in which it is needed, customer food preparation time expectations in the QSR setting are frequently not met with such an approach.

Additionally, as the number of menu options and accommodation of customer special requests or customizations proliferate, there is a need for management of a greater number and variety of food items and constituents. Management of prepared food constituent inventory is more challenging as the number of food constituents increases. Also, as order assembly becomes more complicated, the assembly instructions are harder for food preparation workers to remember and correctly follow. This creates a greater learning curve for new or inexperienced workers or for the introduction of new menu items.

Bread, rolls, or other baked goods commonly form the structure on or within which the substance of a sandwich or other food item is held. Sandwiches, including hamburgers, club sandwiches, open-faced sandwiches, and wrapped sandwiches are commonly prepared foods in restaurants and kitchens. In the QSR, fast casual restaurant, or institutional kitchen setting, handling (and toasting, if necessary) of the baked good can take nearly half of the total time required to prepare the ordered sandwich. As a further challenge, if left exposed, baked goods can quickly become stale, prone to mold, or otherwise degrade in flavor.

The increase in different baked good options further presents a challenge as a greater number of specialty baked goods which are less frequently used must be kept available. As baked goods can quickly begin to degrade when exposed to an uncontrolled environment, solutions that can handle multiple types of baked goods are needed.

Most often baked goods are prepared off-site and delivered to the restaurant for subsequent use. Baked goods are frequently shipped to the restaurant in sealed air-tight bags, or "pillow packs." These pillow packs may be filled with nitrogen or another gas that helps to preserve the baked goods while the air-tight seal is maintained. The baked goods may also be frozen to aid in the preservation of baked good quality during transport and delivery to the restaurant. Once at the restaurant, the pillow packs must be opened before the baked goods can be used and the baked goods must be thawed. As noted above, if left exposed, baked goods can quickly begin to degrade.

There is a trend in restaurants and food service for increased menu options and for accommodation of further customer custom requests. This adds to the complexity of food item orders and foodservice workers are less able to rely on memorization of food item recipes to assemble the order. Increased menu options and custom accommodations further contribute to slow the assembly of these food items.

Thus further solutions are needed for the handling and preparation of baked goods in a restaurant or foodservice setting, particularly in the holding and direction of baked goods into subsequent processing.

BRIEF DISCLOSURE

An example of a bun handling system includes a cassette with opposed side walls. The cassette includes a front wall, an open rear face opposite the front wall, and a floor between the opposed side walls. A cover extends between the opposed side walls above the floor. The cover is movable relative to the opposed side walls and the floor. A slot is defined through the floor from the open rear face in a direction towards the front wall.

In further examples of the bun handling system, the floor of the cassette further extends interior from the front wall, separating the slot from the front wall. The cassette further includes a plurality of lanes defined within the cassette between the opposed side walls. Each of the lanes of the plurality are separated from an adjacent lane of the plurality by an intermediate wall. The cassette may include a plurality of slots and each slot of the plurality of slots extends through the floor from the open rear face in a direction towards the front wall and each lane of the plurality of lanes includes a slot of the plurality of slots. The cover may further include a plurality of ridges that extend outwards from the cover. Each ridge of the plurality of ridges is vertically aligned with a slot of the plurality of slots. The cassette may be a first cassette and the bun handling system may include a second cassette. A plurality of ridges may extend from a cover of the second cassette and are dimensioned to nest within corresponding slots of the plurality of slots of the first cassette when the first cassette is stacked upon the second cassette.

Additional examples of the bun handling system include a bun holding cabinet that defines a compartment. The compartment of the bun holding cabinet may be configured to removably receive the cassette. The bun handling system may be configured to dispense a bun from a dispense point of the bun handling system to a toaster adjacent to the compartment. The cassette may be movable within the compartment to orient the cassette relative to the dispense point. The bun holding cabinet may include a first door into the compartment and configured to receive the cassette filled with a plurality of buns therethrough. The bun holding cabinet may include a second door into the compartment and configured for removal of the cassette after the buns are dispensed.

In further examples of the bun handling system, the bun holding cabinet may include a conveyor arranged within the compartment. The conveyor may be receivable within the slot to extend through the slot to engage a bun within the cassette. The cassette may include a plurality of lanes separated from an adjacent lane of the plurality of lanes by an intermediate wall, and a plurality of slots including the slot, each slot of the plurality of slots extends through the floor from the open rear face in a direction towards the front wall, each lane of the plurality of lanes having a slot of the plurality of slots. The plurality of conveyors may be arranged within the compartment, each of the conveyors of the plurality of conveyors configured to be receivable within a slot of the plurality of slots. The plurality of conveyors may extend through the plurality of slots to engage buns in each lane of the cassette. The plurality of conveyors may be received within the plurality of slots, the plurality of conveyors extend out of the open rear face of the cassette and are operable to move buns from each lane of the cassette out of the open rear face of the cassette. The compartment may include at least one shelf that extends interior the compartment. When the cassette rests on the at least one shelf, the plurality of conveyors are positioned within the plurality of slots.

Additional examples of the bun handling system include a thawing rack with a plurality of shelves. Each shelf of the thawing rack is configured to receive the cassette. The thawing rack further includes a plurality of back walls each oriented relative to one of the shelves of the plurality of shelves. When a cassette is received on a shelf of the plurality of shelves, the shelf covers the slot and the back wall covers the open rear face. The shelves of the plurality of shelves may be spaced apart at a distance to accommodate at least two cassettes in a vertical stack.

An example of a bun handling system includes a plurality of cassettes. Each cassette of the plurality includes opposed sidewalls, a front wall, an open rear face opposite the front wall, and a floor between the opposed side walls. A plurality of lanes are defined within the cassette between the opposed side walls, each of the lanes separated from an adjacent lane of the plurality of lanes by an intermediate wall, and a plurality of slots extend through the floor from the open rear face of the cassette in a direction towards the front wall and each lane of the plurality of lanes includes a slot of the plurality of slots. A cover extends between the opposed side walls above the floor. The cover is movable relative to the opposed side walls and the floor. The cover includes a plurality of ridges extending outward from the cover and each ridge of the plurality of ridges is vertically aligned with a slot of the plurality of slots. A bun holding cabinet includes a compartment. The compartment of the bun holding cabinet is configured to removably receive each cassette of the plurality of cassettes. The bun holding cabinet includes a plurality of conveyors arranged within the compartment. Each of the conveyors of the plurality of conveyors is configured to be receivable within a slot of the plurality of slots. The plurality of conveyors extend through the plurality of slots to engage buns in each lane of the cassette. The plurality of conveyors extend out of the open rear face of the cassette and are operable to move buns from each lane of the cassette out of the open rear face of the cassette.

The bun handling system may include a thawing rack with a plurality of shelves, each shelf of the thawing rack configured to receive at least one cassette of the plurality of cassettes, the thawing rack further comprising a plurality of back walls each oriented relative to one of the shelves of the plurality of shelves. When the cassette is received on a shelf of the plurality of shelves, the shelf covers the slot and the back wall covers the open rear face.

A method of dispensing buns from a bun handling system includes receiving a plurality of buns in each lane of each of the plurality of cassettes. The plurality of cassettes are received within the compartment of the bun holding cabinet. The plurality of conveyors are positioned through the slots of a cassette of the plurality of cassettes to engage the plurality of buns within the cassette with the conveyors. At least one conveyor of the plurality of conveyors is advanced to move a bun out of the cassette to a dispense point of the bun holding cabinet.

DETAILED DISCLOSURE

As provided herein exemplary embodiments of devices and systems for handling and dispensing baked goods in a restaurant or food service setting. The systems and devices as disclosed herein can be exemplarily used to handle a wide variety of baked goods, including but not limited to buns, rolls, English muffins, croissants, bagels, muffins, flatbread, pitas, cakes, pastries, and so forth.

The present disclosure relates to the handling and processing of baked goods in a food preparation and/or restaurant setting. Applicant's currently pending U.S. Patent Application Publication No. 2019/0167040 entitled "Baked Good Handling System", No. 2019/0208964 entitled "Bun Holding Cabinet", and No. 2019/0208793 entitled "Bun Separation" all relate to the handling and processing of baked goods and are each hereby incorporated by reference in their entireties.

Figure 1:
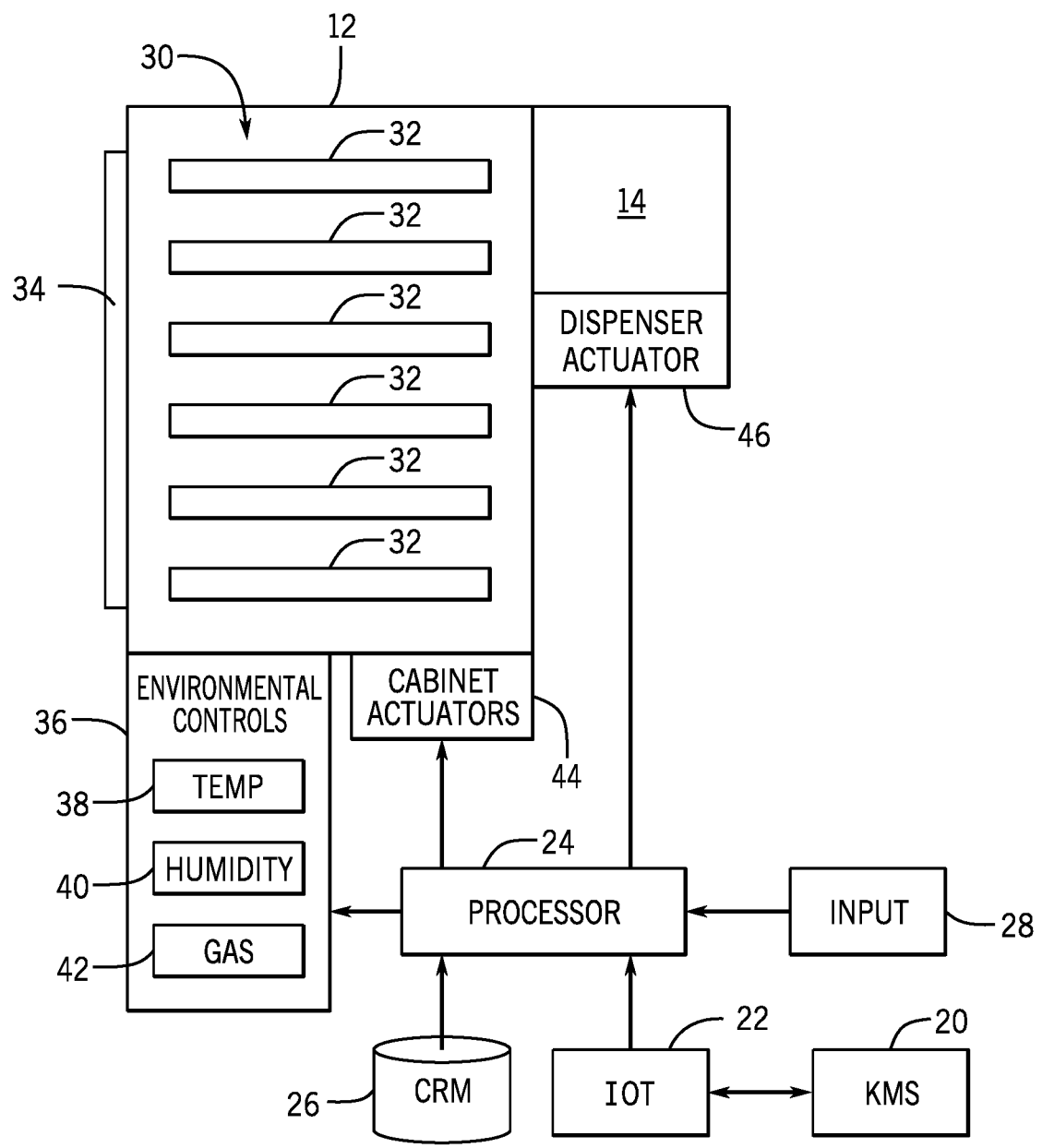
FIG. 1 is a system diagram of an exemplary embodiment of a holding cabinet of a baked goods handling system.

FIG. 1 is a system diagram of an exemplary embodiment of a holding cabinet 12. The holding cabinet 12 includes a dispenser 14 that operates with one or more dispenser actuators 46, for example, gates, conveyors, and/or pushers, that move buns held within the holding cabinet 12 to a next step in the baked good handling system. That next step in the baked good handling system may be a toaster, a sauce dispenser, packaging, or another system as will be recognized by a person of ordinary skill in the art.

A processor 24 is communicatively connected to an IOT communication system 22 which facilitates communication with a kitchen management system (KMS) 20 which operates to receive customer orders, track the progression and delivery of customer orders, and coordinate the preparation of customer orders between a plurality of devices within a kitchen system. The KMS 20 may also track inventory and use of food items by the various systems within the kitchen. The processor 24 receives the instructions regarding a bun required to assemble an ordered sandwich. The processor 24 coordinates the operations and functions of the bun holding cabinet 12 and the dispenser 14 by providing control signals and instructions to various components of the system and collecting data and information from the operation of the system to report back to the KMS through the IOT communication system 22. As used herein, the term processor means any of a variety of known controllers, microcontrollers, integrated circuits, and/or printed circuit boards operable electronic to read and execute computer readable code to produce instructions and control commands as described in further detail herein. The processor 24 is further communicatively connected to a computer readable medium (CRM) 26, which is non-transient and stores computer readable code that is executable by the processor, and upon execution causes the processor to carry out the functions and operations as described in further detail herein.

The processor 24 is further connected to at least one input device 28 associated with the bun holding cabinet 12. The input device 28 may exemplarily include, but is not limited to, a keyboard and/or a touchscreen interface. The input device 28 is operable by a foodservice worker to perform a manual entry of a control or operation of the bun holding cabinet 12. These instructions received by the processor 24 from the input device 28 may be instead of or in addition to those received from the KMS 20. In an embodiment, the foodservice worker may use the input device 28 to request a dispense of a particular bun for a special order sandwich to be prepared manually, or as a replacement for a bun damaged elsewhere during assembly of the sandwich. The foodservice worker may have the option to input or control any of the parameters and functions as described herein.

The bun holding cabinet 12 includes a compartment 30 that defines an enclosed area within which a plurality of cassettes 32 of buns are held. The cassettes 32 will be described in further detail herein. The cassettes 32 may be loaded into the compartment 30 through a door 34 in the bun holding cabinet 12. In embodiments, the door 32 may open with a vertical hinge, while in other embodiments, the door 32 may open with a horizontal hinge. It will be recognized that in still further embodiments, the bun holding cabinet 12 may include a plurality of doors rather than a single door into the compartment 30. In one such embodiment, the cabinet 12 may be configured to hold a plurality of cassettes 32 in a vertically stacked arrangement as depicted in FIG. 1, and a door 34 is provided for each cassette 32 row in the vertical stack. In another embodiment, at least one door may be used to load cassettes 32 into the compartment, while at least one other door may be used to remove cassettes 32 from the compartment.

The processor 24 is communicatively connected to one or more environmental control devices 36. The environmental control devices 36 are operatively connected to the compartment 30 and may include a temperature control device 38 which may include a heating element and/or a refrigeration system depending upon the conditions for optimal holding of the bun within the compartment 30. The environmental control devices 36 may further include humidity control 40, which may include a humidifier and/or a dehumidifier to add or remove moisture from the compartment 30. The environmental control devices 36 may further include gas concentration control 42 which may include supplies of gasses, for example, but not limited to, nitrogen or carbon dioxide that can be added to the compartment 30 to preserve bun freshness and inhibit spoilage before the buns are dispensed. While not depicted in FIG. 2, each of these environmental control devices 36 include associated sensors related to the environmental conditions to be controlled, these may include temperature sensors, humidity sensors, and gas composition sensors located in or directed to the compartment 30.

The processor 24 is communicatively connected to at least one cabinet actuator 44. The cabinet actuator 44 exemplarily operates to move the cassettes 32 and/or buns 50 within the compartment 30 to control the type and order in which buns 50 are removed from the compartment 30. In examples provided herein, the cabinet actuators 44 may operate to move the cassettes 32 within the compartment 30. In examples provided herein, the cabinet actuators 44 may operate to move individual buns from within a cassette 32 to the dispenser 14. Further examples may operate to move both the cassettes 32 and the individual buns within cassettes 32. As described herein, the cabinet actuators 44 may include mechanical elevators, lifts, pushers, or conveyors to position the cassettes 32 within the compartment 30 and/or to move individual buns from the cassettes 32.

Figure 2:
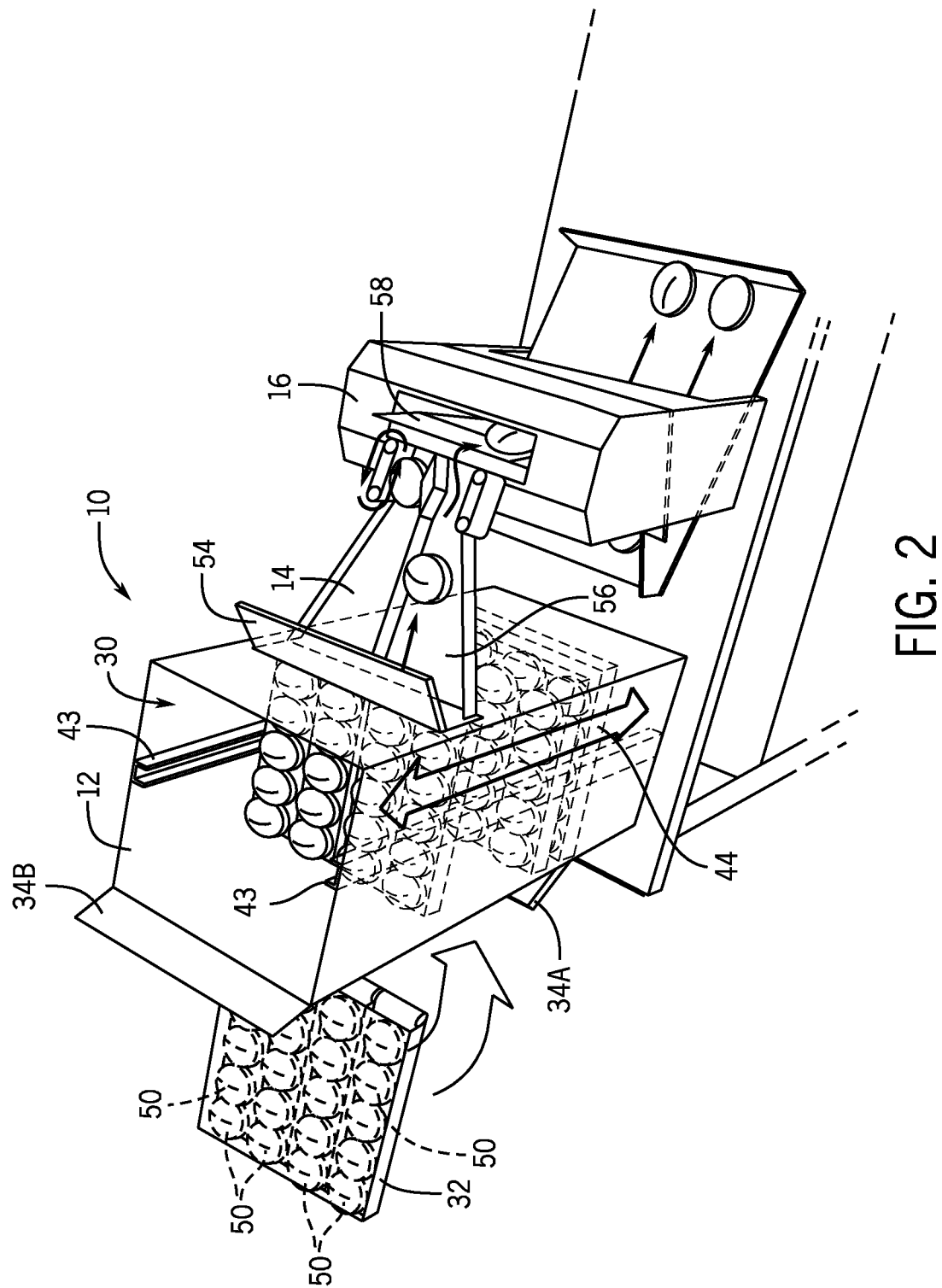
FIG. 2 is a perspective view of the baked goods handling system.

FIG. 2 depicts another example of a baked goods handling system 10 within the scope of the present disclosure. The holding cabinet 12 receives cassettes 32 of the baked goods (e.g. buns 50) through a door 34A into the compartment 30. The compartment 30 provides a controlled environment in which the buns are held prior to dispense. The door 34A exemplarily is horizontally hinged and located at the bottom of the holding cabinet 12. The cassettes 32 are loaded into the bottom of the compartment 30 and are moved into a position for dispense by the cabinet actuators 44 located therein. This limits the portion of the compartment 30 that is exposed or opened each time that a new cassette 32 is loaded into the compartment 30. The compartment 30 may hold a plurality of cassettes 32 therein. The cabinet actuators 44 move the cassettes 32 to a dispensing position. The cabinet actuators 44 may be a mechanical elevator, lift, or conveyor that positions the trays 32 within the compartment 30 of the holding cabinet 12. The buns 50 are dispensed from the cassette 32 in the dispensing position within the compartment 30, for example a position that is in alignment with the dispenser 14 and/or a door 54 that leads to the dispenser 14. The holding cabinet 12 dispenses selected baked goods from these cassettes 32. The dispenser 14 exemplarily includes a ramp 56 that directs a bun 50 by gravity feed to position a bun 50 relative to the toaster 16.

In examples, the cassettes 32 are held within the compartment 30. The cassettes 32 are movable and removable within the compartment 30 to load buns 50 into the compartment and to remove empty cassettes 32 from the compartment 30 for refilling with buns 50. In such examples, once loaded into the compartment 30, the cassettes 32 remain in a stationary position within the compartment 30. Cabinet actuators 44, as described herein, engage buns 50 within the cassettes 32 to selectively move buns 50 from the cassettes 32 to the dispenser 14. In such examples, the holding cabinet 12 may include multiple doors 54 or may include a door 54 of a sufficient size to enable dispense of buns 50 from multiple locations of cassettes 32 within the compartment. In still further examples, shuttles, arms, or other actuators as described US Patent Application Publication Nos. 2019/0167040, 2019/0208964, and 2019/0208793 may move a bun removed from the cassette 32 by the cabinet actuator 44 to the dispenser 14 or the toaster 16.

As depicted in FIG. 2, the cassettes 32 are exemplarily movable in a vertical direction along rails 43. This may also provide for inventory management as some cassettes 32 may be dedicated to specialty or lower volume baked goods while other cassettes 32 may be dedicated to high volume baked goods. The high volume baked goods can thus be used and replenished more frequently while the holding cabinet maintains the quality of the specialty/lower volume baked goods awaiting use in an order. The cassettes 32 may fit one across a width of the compartment 30, while in other examples, two or more cassettes 32 may fit across the width of the compartment 30 and individual stacks of cassettes 32 may be movable within the compartment 30. While FIG. 2 depicts a cassette 32 that matches the width of the compartment 30, other examples may provide two or more vertical columns or stacks of cassettes that are exemplarily half-width or third-width, whereby each column of cassettes 32 holds buns 50 of a different type. Corresponding doors 34A may only extend across the compartment 30 for a dimension sized to fit the cassette to be received therein. This, for example, may provide storage, management, and dispensing of two or more different types of buns from a single holding cabinet 12.

The cassettes 32 may be configured to receive a cabinet actuator, exemplarily a conveyor or a pusher that operates to engage a bun 50 or plurality of buns 50 within a cassette 32 at the dispense position to advance a bun 50 out of the compartment 30. While not depicted in FIG. 2, the holding cabinet 12 includes such cabinet actuators 44. These cabinet actuators 44 are exemplarily depicted and described later herein with respect to FIGS. 3A-3C.

In an exemplary and non-limiting description of operation of the holding cabinet 12, cassettes 32 filled with buns 50 are loaded into the bottom of the holding cabinet 12 through door 34A. The holding cabinet 12 creates and maintains a controlled environment within the compartment 30 of the holding cabinet 12. As more buns are needed/used, the holding cabinet 12 moves cassettes 32 upwards from a position at the door 34A to a position adjacent the dispensing position, for example relative to the gate 54 and/or the dispenser 14. This cycles a cassette filled with buns to the dispensing position to replace an empty cassette or to replace a cassette filled with buns determined to be held beyond a holding time limit. Exit of the buns 50 from the holding cabinet 12 may be controlled by the gate 54 or with a cabinet actuator 44 that engages the buns. As described above, this may be pusher or a conveyor. Examples of a conveyor cabinet actuator 44 are described in further detail with respect to FIGS. 3A-3C. Once the buns 50 from a cassette 32 have been dispensed, the holding cabinet 12 moves the empty cassette further up along the rails 43 within the compartment 30 of the holding cabinet 12 for storage and/or removal from a door 34B, which may be located at the top of the holding cabinet 12 at a position above the dispense position. As previously described, a cassette 32 filled with buns 50 can then be loaded into the dispensing position within the holding cabinet 12. A new cassette 32 filled with buns 50 can be loaded into the compartment 30 through the door 34A. It will also be recognized that this order of loading and unloading may also be reversed. A person of ordinary skill in the art will recognize variations from this disclosed embodiment that are within the scope of the present disclosure.

Figure 3A:
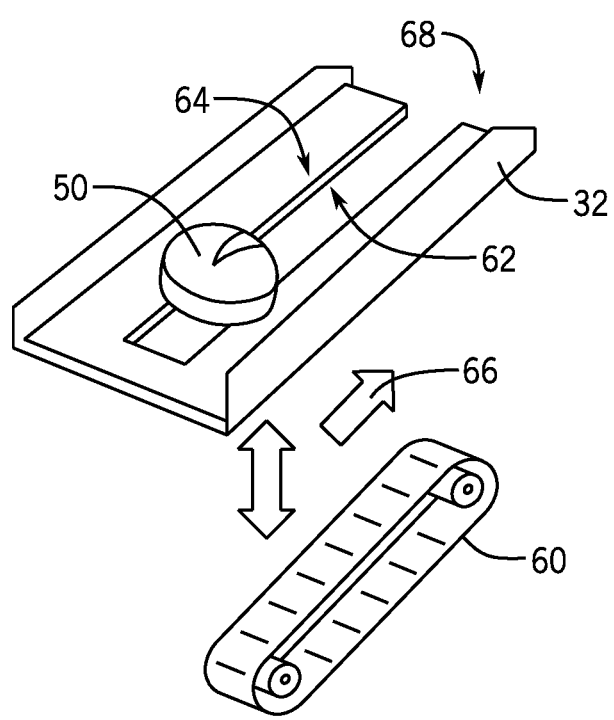
FIG. 3A is a schematic depiction of a cassette and a conveyor.
Figure 3B:
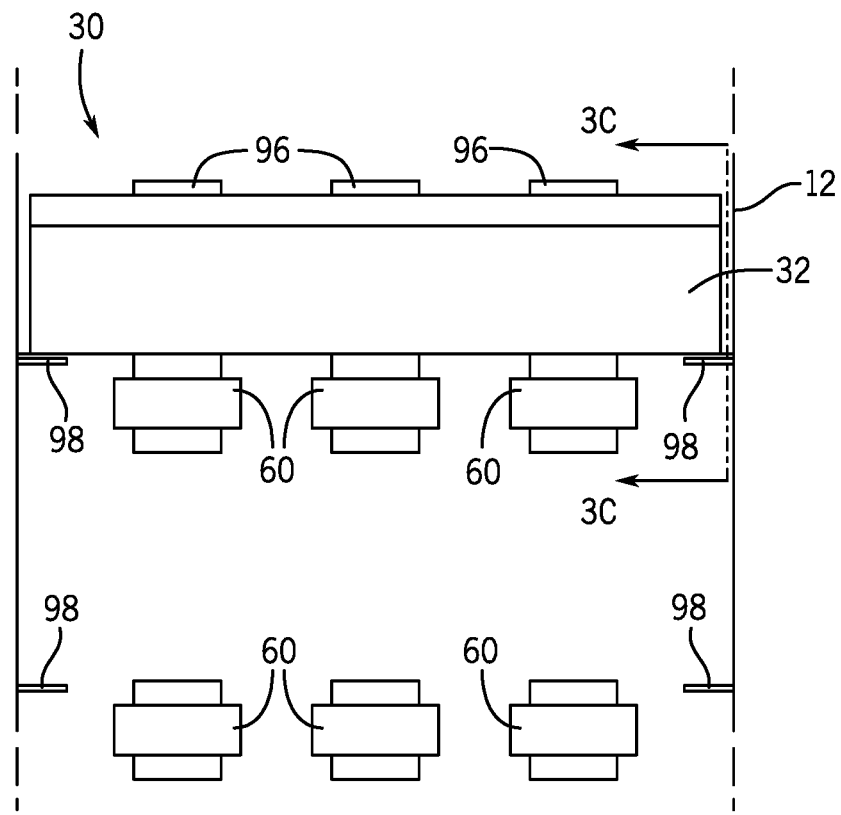
FIG. 3B depicts an example of a portion of a compartment of a holding cabinet with a cassette and a conveyor.
Figure 3C:
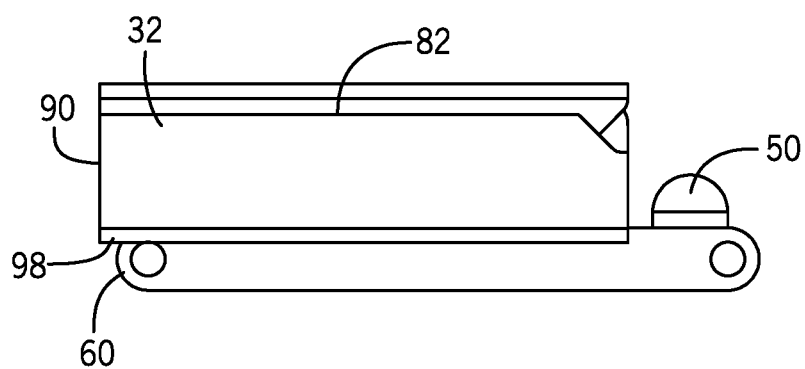
FIG. 3C is a side view taken along line 3C-3C of FIG. 3B.

FIGS. 3A-3C depict related examples of the interaction between a cassette 32 and a cabinet actuator in the exemplary form of a conveyor 60, for example as may occur within a compartment 30 of a holding cabinet 12 as described above. As depicted in FIG. 3A, the conveyor 60 and the cassette 32 are movable with relative to each other, within the compartment 30. It will be recognized that while the cassette 32 is depicted in FIG. 3A without a cover 82 or a front wall 90 as described in further detail herein, that cassettes 32 may also include those features, while in FIG. 3A, removal of those features promotes visibility of the inside of the cassette 32. Furthermore, while the cassette 32 in FIG. 3A is configured to receive a single row of buns therein, it will be recognized through other examples provided herein that cassettes may be configured to receive other number of rows of buns.

The cassette 32, filled with buns 50 moved to the dispensing position within the compartment 30 and the conveyor 60 is movable within a slot 62 through a floor 64 of the cassette 32. In one example, one set of conveyors may be arranged relative to the dispensing position and the conveyors 60 moved through the slot to engage buns 50 in the cassette 32 at the dispensing position. The bun 50 rests on the floor 64 of the cassette 32, straddling the slot 62. Extending through the slot 62, the conveyor 60 engages the bun 50, lifting it from the floor 64 of the cassette 32. In an example, the bun 50 may remain in contact with the floor 64, while in other examples, lifting the bun 50 with the conveyor 60 off of the floor 64 helps to reduce friction between the floor 64 and the bun 50 and helps to advance the bun 50 in the direction of arrow 66 with movement of the conveyor 60. The slot 62 may extend all the way to an open end 68 of the cassette 32. This way, the conveyor 60 can extend the length of the cassette 32 and/or beyond the length of the cassette 32 to move buns 50 from the cassette 32 out of the compartment 30 to the dispenser 14.

It will be recognized that the embodiment depicted in FIG. 3A is schematic in nature and may used with more or fewer components as shown therein. Further examples of cassettes are provided herein and it is recognized that features between those as shown in all of the figures herein may be used in embodiments while remaining within the scope of the present disclosure.

FIG. 3B depicts an example of a portion of a compartment 30 of a holding cabinet 12 with a cassette 32 and a plurality conveyors 60. The cassette 32 is exemplarily configured to receive three rows of buns, and is similar in shape and construction to those cassettes as depicted and described in further detail with respect to FIGS. 4A-5C. FIG. 3C is a side view taken along line C-C of FIG. 3B. The cassette 32 rests upon shelves 98 which extend into the interior of the cabinet 30. When positioned on the shelves 98, the cassette 32 is held over the respective conveyors 60, which are arranged to correspond to the slots in the bottoms of the cassettes 32 (see FIGS. 3A and 5A-C). FIG. 3B includes a second set of shelves 98 and conveyors 60, but without a cassette 32 loaded thereon. It can be seen from this second set of shelves 98 and conveyors 60 that the conveyors 60 extend above a plane formed by the shelves 98.

As seen in FIG. 3C, when the cassette 32 is loaded into the cabinet and rests upon the shelves 98, the conveyors 60 extend through the slots into the cassette to engage the buns 50 stored therein. The conveyor 60 extends out of a back end of the cassette 32. Advancement of the conveyor 60 moves a bun 50 out of the cassette 32 to be to be delivered from the compartment 30 to the dispenser 14.

Currently, baked goods often are received from a bakery in bagged "pillow packs." The pillow packs are constructed and treated such as to create an environment suitable for holding and preserving quality of the baked goods therein. However, upon opening the pillow pack, the baked goods will quickly begin to degrade and become stale. Thus, in use, the pillow packs may be opened and the baked goods directly loaded into a cassette 32 and moved to the controlled environment of the holding cabinet 12. This limits the exposure of the baked goods to the ambient air and enables the holding cabinet 12 to promote baked good holding and quality. In exemplary embodiments, individual cassettes 32 may be sized and/or dimensioned such as to receive the entirety of a "pillow pack" of baked goods such that the cassette 32 can accommodate all of the baked goods of the "pillow pack," once it is opened. This limits the likelihood that baked goods will be held outside of the controlled environments of the "pillow pack", the cassette 32, the holding cabinet 12. In other embodiments, cassettes 32 or portions of cassettes 32 may be configured to accommodate a regular portion of a pillow pack of baked goods, for example half of a pillow pack. In this manner, two cassettes 32 can be filled with the contents of an opened pillow pack.

The cassette 32 as described herein may also be used for the thawing and handling of buns removed from the pillow packs but prior to cassettes being received within the holding cabinet 12. As previously noted, to maintain the quality of buns during transport from a bakery to the restaurant, the buns may be frozen. In other settings, the buns may be shipped in uninsulated environments which may expose them to freezing temperatures. In either event, the buns may have to be thawed when they are received at the restaurant. In the embodiments, it may be advantageous for the buns to thaw outside of the enclosed environment of the pillow pack; however, it is still desirable to limit the exposure of the buns to the open air. As described herein, embodiments of the cassettes 32 may be used in the thawing process to limit the amount of air surrounding the buns which will extend their shelf life when compared to leaving buns in the open air. In the embodiments described herein, each cassette 32 may be configured to nest with a cassette 32 positioned above or below it during a bun transfer out of the pillow pack operation in order to minimize the air circulation around the buns. The cassette 32 can be placed into a thaw rack 70 as will be described in further detail herein which operates to close the cassette 32, minimizing air exposure. The thaw rack 70 may be held in the ambient environment of the kitchen, or may be placed in a refrigerating or a warming device to further control the temperature and environment within which the bun within the cassettes 32 may thaw and be held prior to being placed in the holding cabinet 12.

Like reference numerals are used herein to denote similar components between examples while focusing the disclosure on features shown in each example. A person of ordinary skill in the art will recognize from the present disclosure that components between the various examples may be combined and recombined with more or fewer components to arrive at still further examples within the scope of the present disclosure.

Figure 4A:
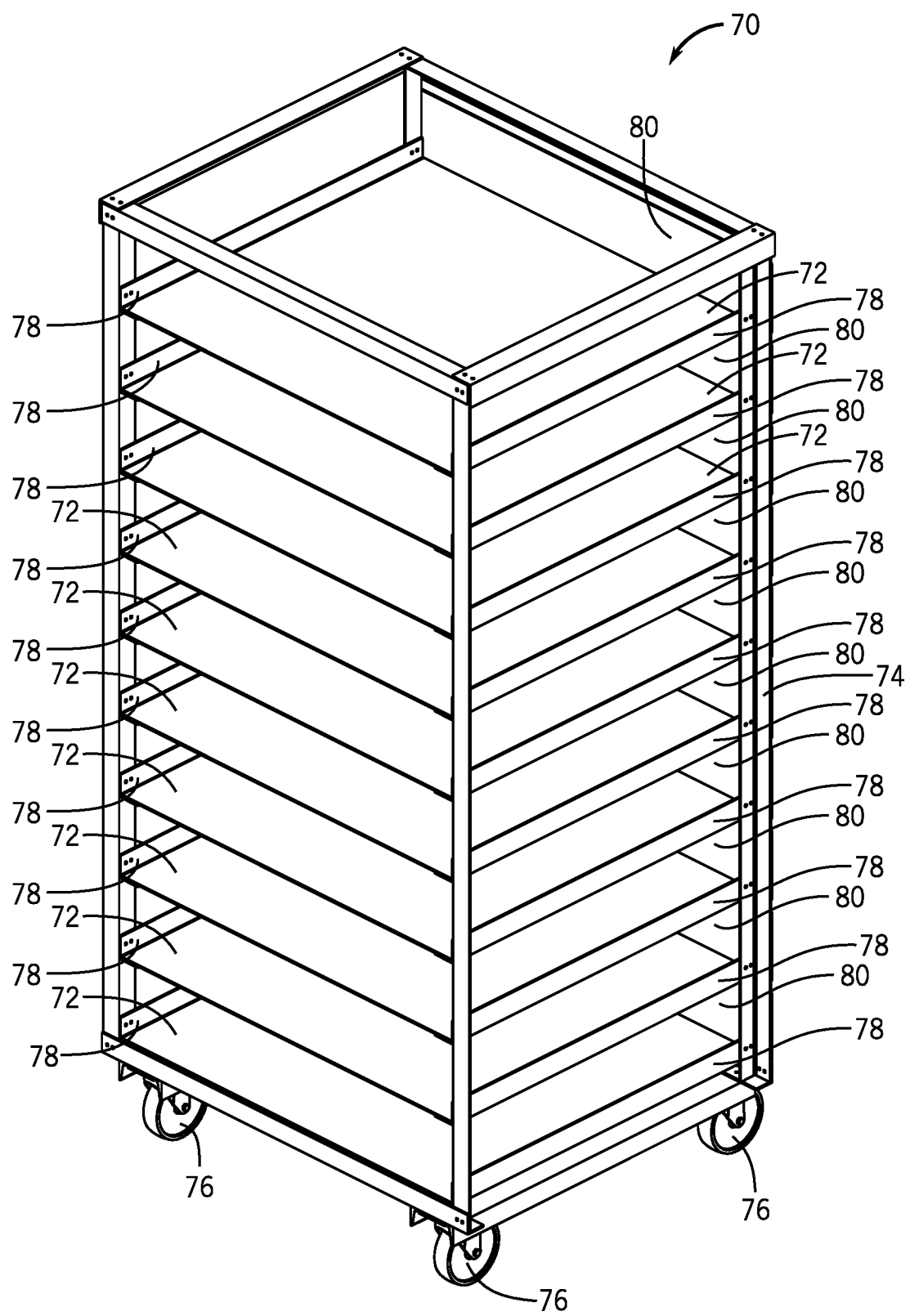
FIG. 4A depicts a thawing rack without bun cassettes.
Figure 4B:
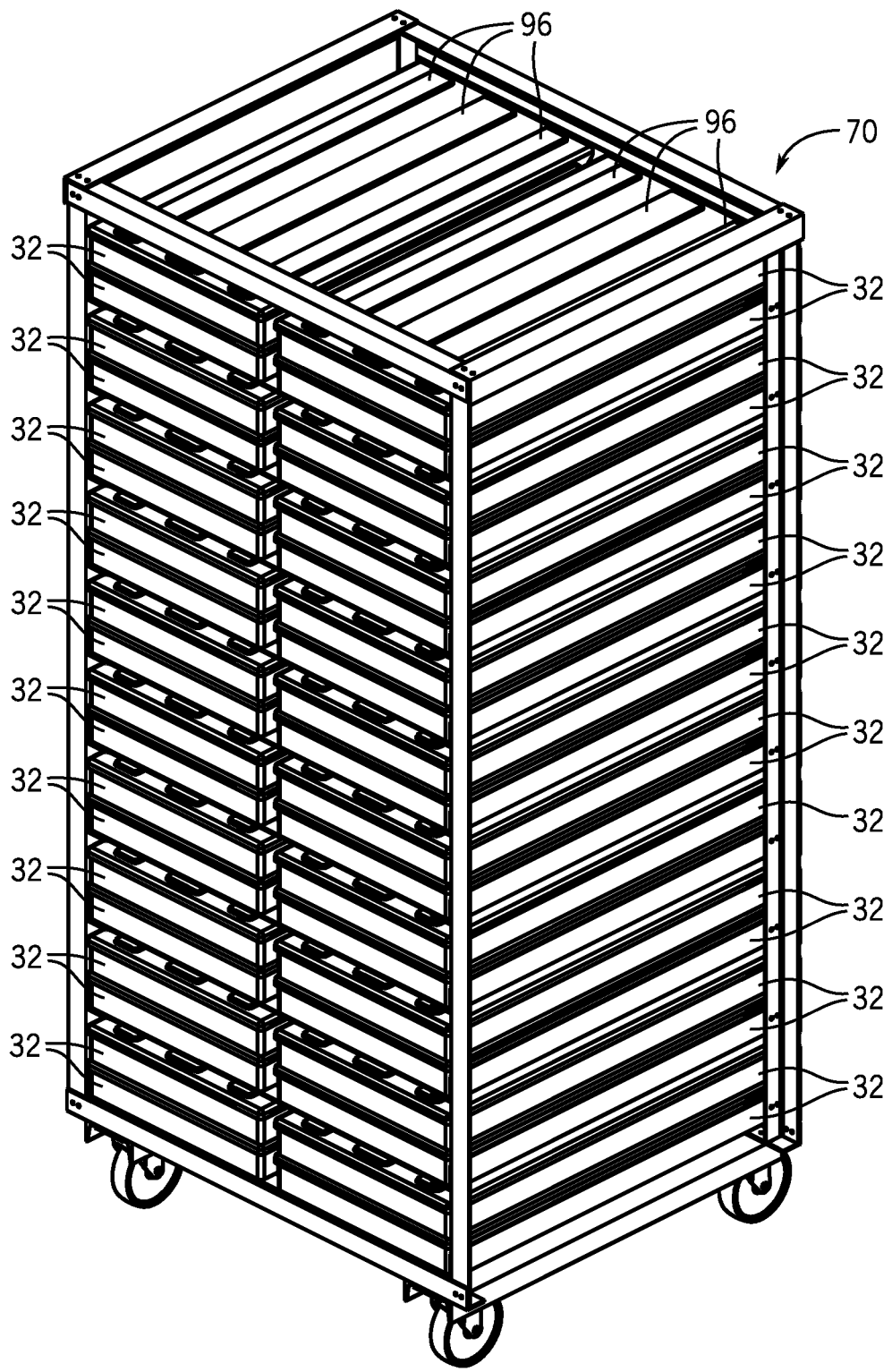
FIG. 4B depicts the thawing rack of FIG. 4A exemplarily loaded with bun cassettes.

FIGS. 4A and 4B depict an example of a thawing rack 70. The thawing rack 70 in FIG. 4A depicts the thawing rack 70 in an empty condition while FIG. 4B depicts the thawing rack filled with a plurality of cassettes 32. The cassettes 32 are exemplarily in the configuration as shown and described with respect to FIGS. 5A-5C. As noted above, it is desirable to provide the buns with an environment for holding and/or thawing after the buns have been removed from the pillow packs, but prior to the buns being placed in the bun dispenser 12 described above. The thawing rack 70 facilitates this holding process which may be done in an ambient environment of the kitchen or may be done in a cooler, warmer, or other controlled environment.

Referring to FIG. 4A, the thawing rack 70 includes a plurality of shelves 72. In embodiments, the shelves 72 are vertically spaced apart at an exemplary dimension configured to receive two cassettes 32 in the vertical dimension between adjacent shelves 72. However, it will be recognized that in other embodiments a greater or a lesser space between adjacent shelves 72 may be provided. The shelves 72 are secured to a frame 74 that exemplarily include vertical components and horizontal components which may be secured by a rivet or a welding or another form of fastening as will be recognized by a person of ordinary skill in the art. The frame 74 may further include wheels 76 which enable the thawing rack 70 to be moved within a kitchen and for example into a controlled environment area or to be moved into a position adjacent to the bun holding cabinet 12 for loading of the bun holding cabinet 12 with cassettes 32 filled with buns.

The shelves 72 are further dimensioned such as to receive two cassettes 32 horizontally adjacent to one another across the width of a shelf 72. However, it will be recognized that dimensioning of the cassettes 32 and/or the shelves 72 may be made such as to accommodate more or fewer than two cassettes 32 across a width of a shelf 72. The widths of the shelf 72 may further be defined by lips 78 extending from the shelves 72 and secured to the frame 74. The shelves 72 further include back walls 80 that extend across the width of the shelves 72 at the rear of the shelves 72 and are secured to the frame 74.

As depicted in FIG. 4B, a plurality of cassettes 32, filled with buns, are loaded into the thawing rack 70 to hold the buns within the cassettes 32 until the buns can be loaded into the bun holding cabinet. In exemplary embodiments, the cassettes 32 may be color coded or include some further type of identification such as to identify the type of bun contained within different cassettes 32. In an example, different colors of cassettes 32 may be used to distinguish between regular buns or club buns while still other colors may identify wheat buns, brioche buns, ciabatta buns, hoagie rolls, or other types of baked goods as may be used within the systems of the present disclosure.

As discussed above and will be discussed in further detail, the cassettes 32 are exemplarily partially open with slots 62 in the floors 64 and open end 68 to the rear of the cassette 32. In the embodiment of the thawing rack 70, the shelf 72 and the end plate 80 are configured and dimensioned such as to engage with the cassette 32 to close off these openings of the cassette 32 in a manner such as to provide the limitation of circulation of the air surrounding the buns held within the cassettes 32 with air external to the cassettes 32 as well as to limit the circulation of the air within the cassettes 32. By blocking the slot 62 and the open end 68 of the cassettes 32 respectively with the shelf 72 and the back wall 80, an environment about the buns within the cassettes 32 is provided with a limited exposure to the ambient air.

FIG. 4B further depicts two configurations or manners in which the slots 62 may be blocked or partially blocked to limit exposure to ambient air. The slots 62 may be blocked by the cassette 32 resting on a shelf which extends across the slot 62. The covers 82 of the cassettes 32 may include ridges 96, which are described in further detail with respect to FIGS. 5A-5C. The cassettes 32 may further be stacked on top of each other, with the ridges 96 of a lower cassette 32 nesting within the slot 62 of the upper cassette 32.

Figure 5A:
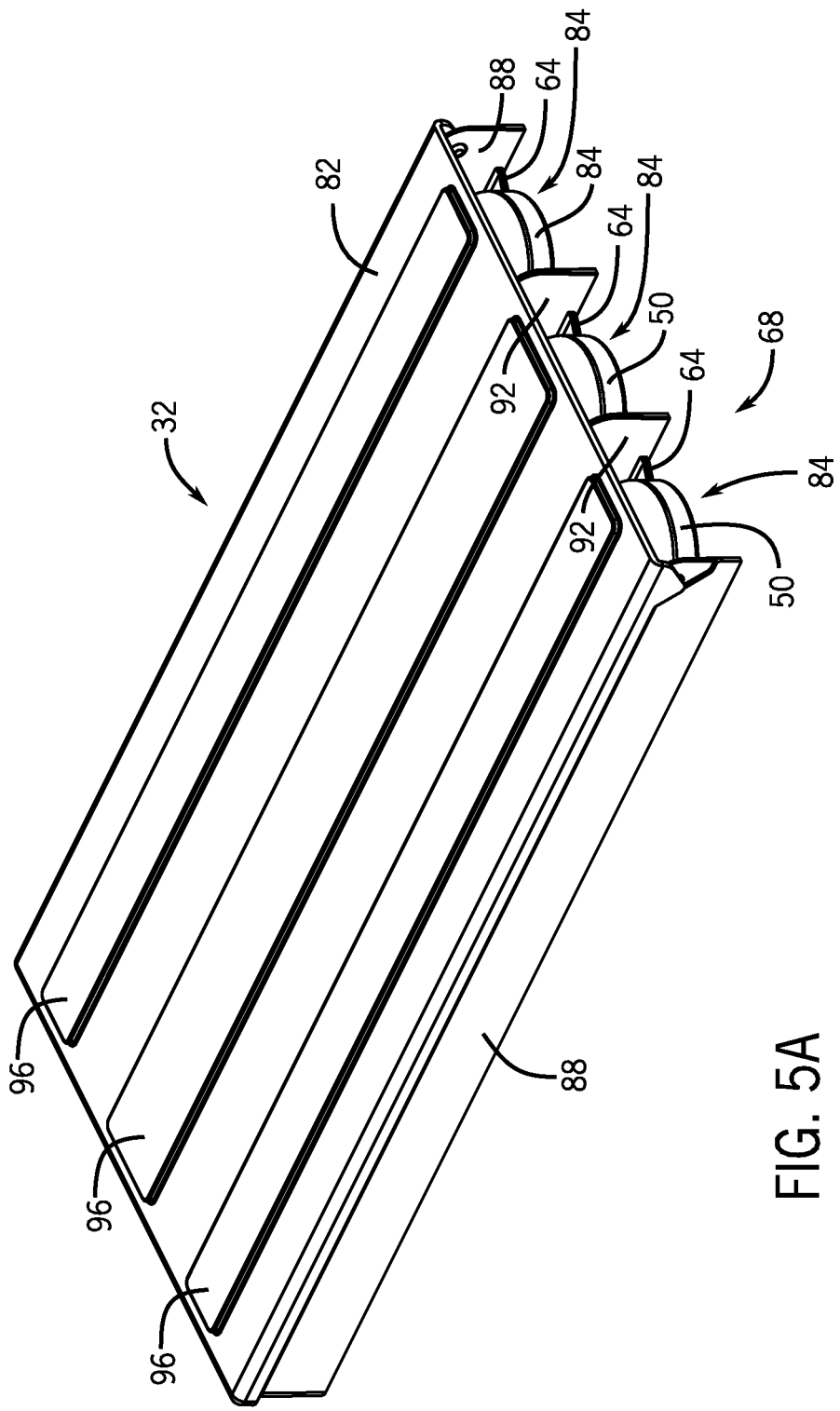
FIGS. 5A-5C depict an example of a bun cassette.
Figure 5B:
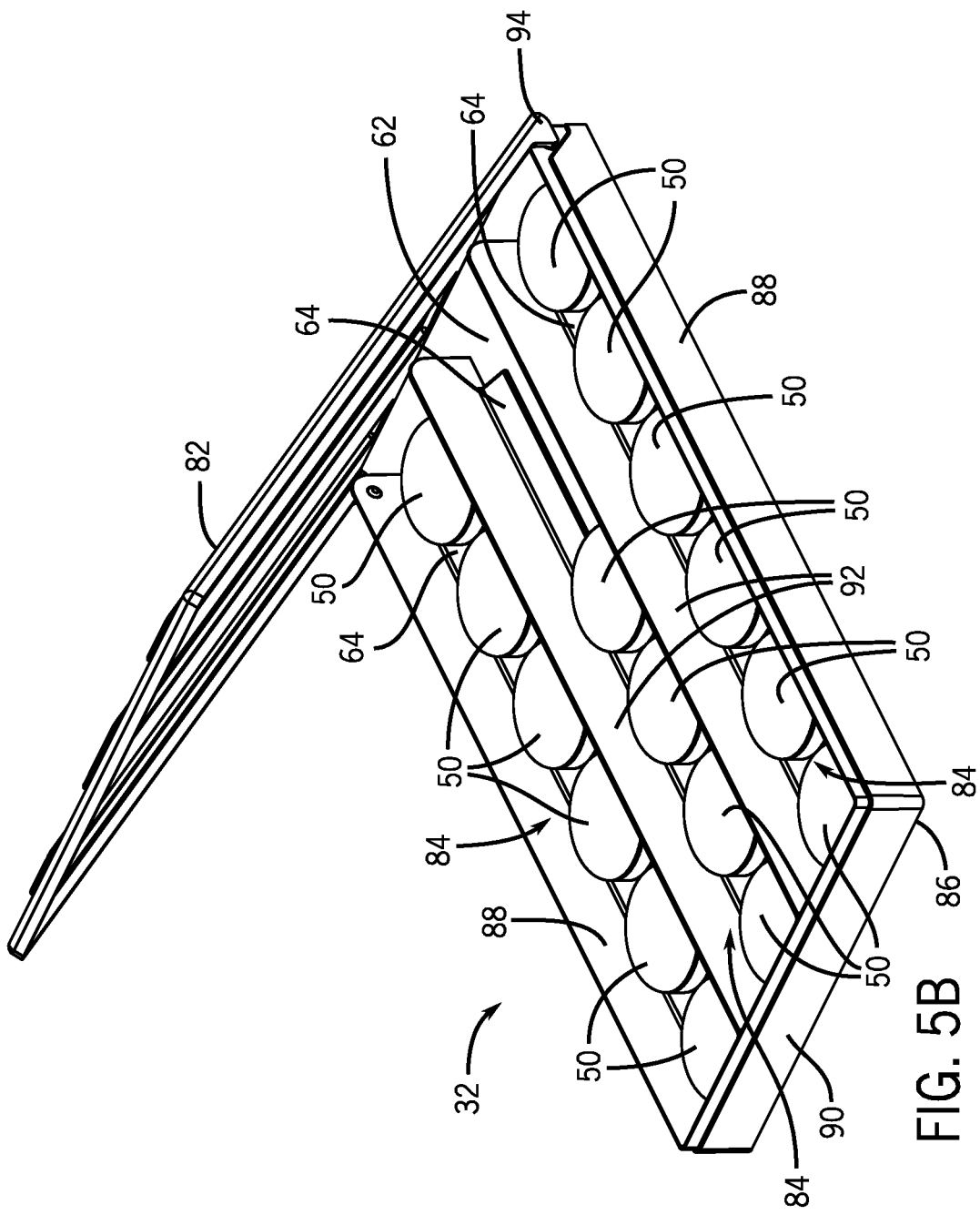
Figure 5C:
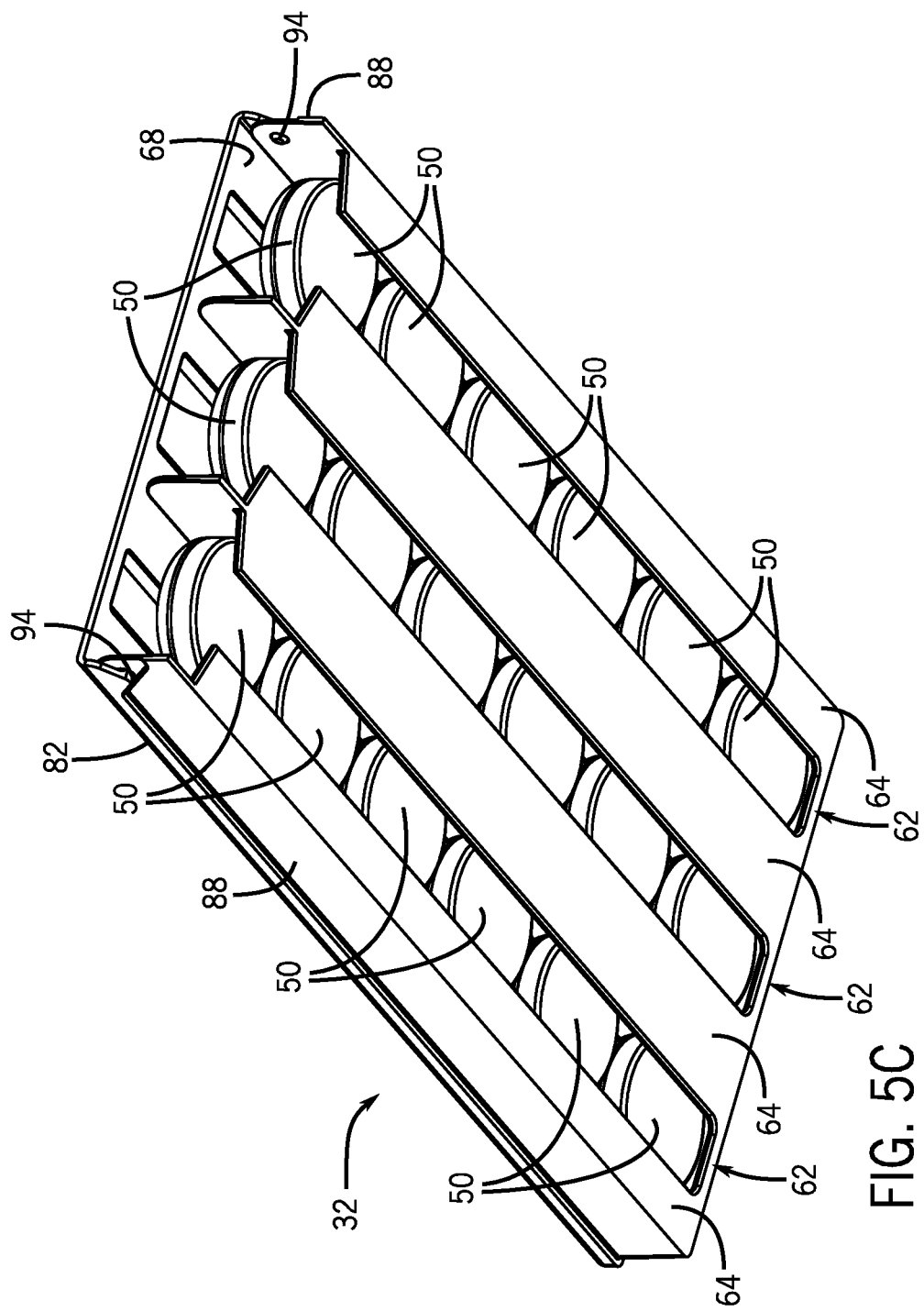

FIGS. 5A-5C provide a more detailed depiction of an exemplary embodiment of cassette 32. FIG. 5A is a top rear perspective view of the cassette 32. FIG. 5B is a top front perspective view of the cassette 32 with the cover 82 in an open or partially open configuration. FIG. 5C is a bottom rear perspective view of the cassette 32 in a closed configuration. As previously described, the cassette 32 is configured to hold a plurality of buns 50 therein. While the cassette 32 depicted in FIGS. 5A-5C exemplarily provides the buns 50 in three lanes 84, it will be recognized that other embodiments of cassettes 32 may have more or fewer than three lanes 84. The lanes 84 are exemplarily defined in a cassette body 86 with a side wall 88, a front wall 90, and intermediate walls 92. The cassette 32 is open towards the rear face of the cassette 32 opposite the front wall 90. The cover 82 is hingedly connected to the body 86, for example, at a pivot point 94. The cover 82 rotates about the pivot point 94 between a closed position as shown in FIGS. 5A and 5C and an open position exemplarily as shown in FIG. 5B. The opening of cover 82 facilitates the filling of the cassette 32 with buns 50 from a pillow pack.

As best shown in FIG. 5A, the cover 82 further includes ridges 96. The ridges 96 are exemplarily dimensioned and otherwise configured to be received within the slot 62 of an adjacently above cassette 32. The ridges 96 thereby close the slot 62 of the adjacently above cassette 32 when stacked thereon as for example shown in FIG. 4B. This facilitates closure of the environment about the buns 50 within the cassette limiting and/or minimizing air exchange and circulation therein. The ridges 96 may exemplarily include ribbon or textural features or a material, for example, an elastomeric material to further facilitate the engagement and closure of the ridges 96 within the slots 62.

As described above, exemplary processes for handling baked goods include a number of actions performed by and with components of the baked goods handling system 10, including, but not limited to the bun holding cabinet 12. These actions may be performed by individual initiation at each of the components, for example, upon user inputs or actuations at each of the components as described herein, or may be performed automatedly based upon instructions provided by the KMS through the IOT system as described above. In still further embodiments, the components of the baked goods handling system may communicate directly with one another for example by wired or wireless communication. In a still further embodiment, the baked goods handling system 10 may be integrated into a single apparatus that provides holding, dispensing and toasting functions.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A bun handling system, comprising:
a cassette comprising opposed side walls, a front wall, an open rear face opposite the front wall, and a floor between the opposed side walls;
wherein a cover extends between the opposed side walls above the floor, wherein the cover is movable relative to the opposed side walls and the floor; and
wherein a slot is defined through the floor from the open rear face in a direction towards the front wall.

2. The bun handling system of claim 1, wherein the floor of the cassette further extends interior from the front wall, separating the slot from the front wall.

3. The bun handling system of claim 2, further comprising a plurality of lanes defined within the cassette between the opposed side walls, each of the lanes of the plurality separated from an adjacent lane of the plurality by an intermediate wall.

4. The bun handling system of claim 3, wherein the cassette comprises a plurality of slots, the plurality of slots including the slot, and each slot of the plurality of slots extends through the floor from the open rear face in a direction towards the front wall, each lane of the plurality of lanes having a slot of the plurality of slots.

5. The bun handling system of claim 4, wherein the cover further comprises a plurality of ridges extending outwards from the cover, and each ridge of the plurality of ridges is vertically aligned with a slot of the plurality of slots.

6. The bun handling system of claim 5, wherein the cassette is a first cassette and further comprising a second cassette, wherein a plurality of ridges extending from a cover of the second cassette are dimensioned to nest within corresponding slots of the plurality of slots of the first cassette when the first cassette is stacked upon the second cassette.

7. The bun handling system of claim 1, further comprising a bun holding cabinet defining a compartment, the compartment of the bun holding cabinet configured to removably receive the cassette.

8. The bun handling system of claim 7, wherein the bun handling system is configured to dispense a bun from a dispense point of the bun handling system to a toaster adjacent to the compartment.

9. The bun handling system of claim 8, wherein the cassette is movable within the compartment to orient the cassette relative to the dispense point.

10. The bun handling system of claim 9, further comprising a first door into the compartment and configured to receive the cassette filled with a plurality of buns therethrough and comprising a second door into the compartment and configured for removal of the cassette after the buns are dispensed.

11. The bun handling system of claim 7, further comprising a conveyor arranged within the compartment, the conveyor receivable within the slot to extend through the slot to engage a bun within the cassette.

12. The bun handling system of claim 7, further comprising:
wherein the cassette comprises a plurality of lanes separated from an adjacent lane of the plurality of lanes by an intermediate wall, and a plurality of slots including the slot, each slot of the plurality of slots extends through the floor from the open rear face in a direction towards the front wall, each lane of the plurality of lanes having a slot of the plurality of slots;

a plurality of conveyors arranged within the compartment, each of the conveyors of the plurality of conveyors configured to be receivable within a slot of the plurality of slots;

wherein the plurality of conveyors extend through the plurality of slots to engage buns in each lane of the cassette.

13. The bun handling system of claim 12, wherein when the plurality of conveyors are received within the plurality of slots, the plurality of conveyors extend out of the open rear face of the cassette and are operable to move buns from each lane of the cassette out of the open rear face of the cassette.

14. The bun handling system of claim 12, wherein the compartment further comprises at least one shelf extending interior the compartment, wherein when the cassette rests on the at least one shelf, the plurality of conveyors are positioned within the plurality of slots.

15. The bun handling system of claim 7, further comprising a thawing rack with a plurality of shelves, each shelf of the thawing rack configured to receive the cassette, the thawing rack further comprising a plurality of back walls each oriented relative to one of the shelves of the plurality of shelves;

wherein when the cassette is received on a shelf of the plurality of shelves, the shelf covers the slot and the back wall covers the open rear face.

16. The bun handling system of claim 15, wherein the shelves of the plurality of shelves are spaced apart at a distance to accommodate at least two cassettes in a vertical stack.

17. The bun handling system of claim 16, wherein the cassette is a first cassette and further comprising a second cassette, wherein a plurality of ridges extending from a cover of the second cassette are dimensioned to nest within corresponding slots of the plurality of slots of the first cassette when the first cassette is stacked upon the second cassette.

18. A bun handling system, comprising:
a plurality of cassettes, each cassette of the plurality comprising: opposed side walls, a front wall, an open rear face opposite the front wall, and a floor between the opposed side walls;
wherein a plurality of lanes are defined within the cassette between the opposed side walls, each of the lanes separated from an adjacent lane of the plurality of lanes by an intermediate wall, and a plurality of slots extend through the floor from the open rear face of the cassette in a direction towards the front wall and each lane of the plurality of lanes includes a slot of the plurality of slots; and
a cover extends between the opposed side walls above the floor, wherein the cover is movable relative to the opposed side walls and the floor, the cover comprising a plurality of ridges extending outward from the cover and each ridge of the plurality of ridges is vertically aligned with a slot of the plurality of slots; and
a bun holding cabinet defining a compartment, the compartment of the bun holding cabinet configured to removably receive each cassette of the plurality of cassettes, the bun holding cabinet comprising:
a plurality of conveyors arranged within the compartment, each of the conveyors of the plurality of conveyors configured to be receivable within a slot of the plurality of slots;
wherein the plurality of conveyors extend through the plurality of slots to engage buns in each lane of the cassette, wherein the plurality of conveyors extend out of the open rear face of the cassette and are operable to move buns from each lane of the cassette out of the open rear face of the cassette.

19. The bun handling system of claim 18, further comprising a thawing rack with a plurality of shelves, each shelf of the thawing rack configured to receive at least one cassette of the plurality of cassettes, the thawing rack further comprising a plurality of back walls each oriented relative to one of the shelves of the plurality of shelves;

wherein when the cassette is received on a shelf of the plurality of shelves, the shelf covers the slot and the back wall covers the open rear face.

20. A method of dispensing buns from the bun handling system of claim 18, the method comprising:
receiving a plurality of buns in each lane of each of the plurality of cassettes;
receiving the plurality of cassettes within the compartment of the bun holding cabinet;
positioning the plurality of conveyors through the slots of a cassette of the plurality of cassettes to engage the plurality of buns within the cassette with the conveyors; and
advancing at least one conveyor of the plurality of conveyors to move a bun out of the cassette to a dispense point of the bun holding cabinet.

* * * * *